United States Patent [19]

Kouzaki

[11] Patent Number: 5,633,953

[45] Date of Patent: May 27, 1997

[54] IMAGE PROCESSING APPARATUS HAVING IMPROVED COLOR-REPRODUCIBILITY OF COLOR IMAGE

[75] Inventor: Masahiro Kouzaki, Gamagoori, Japan

[73] Assignee: Minolta Co., Ltd., Osaka, Japan

[21] Appl. No.: 543,146

[22] Filed: Oct. 13, 1995

Related U.S. Application Data

[63] Continuation of Ser. No. 215,737, Mar. 22, 1994, abandoned.

[30] Foreign Application Priority Data

Mar. 24, 1993 [JP] Japan .................... 5-065195

[51] Int. Cl.$^6$ .................... H04N 1/46; G03F 3/08
[52] U.S. Cl. .................... 382/167; 358/500; 358/517; 358/518; 358/523
[58] Field of Search .................... 358/500, 512, 358/515, 517, 518, 520, 523; 348/660, 661; 382/167; H04N 1/46; G03F 3/08

[56] References Cited

U.S. PATENT DOCUMENTS

| | | | |
|---|---|---|---|
| 4,745,466 | 5/1988 | Yoshida et al. | 358/517 |
| 4,954,889 | 9/1990 | Endo et al. | 358/517 |
| 4,962,421 | 10/1990 | Murai | 358/76 |
| 4,979,031 | 12/1990 | Tsuboi et al. | 358/75 |
| 4,989,079 | 1/1991 | Ito | 358/80 |
| 4,989,080 | 1/1991 | Ito | 358/517 |
| 5,165,071 | 11/1992 | Moriya et al. | 358/443 |
| 5,181,105 | 1/1993 | Udagawa et al. | 358/520 |
| 5,262,833 | 11/1993 | Fukushima et al. | 355/327 |

FOREIGN PATENT DOCUMENTS

0415648A2 3/1991 European Pat. Off. .
60-249470 12/1985 Japan .

*Primary Examiner*—Edward L. Coles, Sr.
*Assistant Examiner*—Kimberly A. Williams
*Attorney, Agent, or Firm*—Sidley & Austin

[57] ABSTRACT

In an image processing apparatus according to the invention, a first color and a second color are designated. A color conversion matrix is produced based on the designated first and second colors. With the color conversion matrix, the information of the first color included in an input image signal including color information is converted into the second color information.

4 Claims, 18 Drawing Sheets

IMAGE PROCESSING APPARATUS HAVING IMPROVED COLOR-REPRODUCIBILITY OF COLOR IMAGE

This application is a continuation of application Ser. No. 08/215,737, filed Mar. 22, 1994, abandoned.

BACKGROUND OF THE INVENTION

1. Field of the Invention

The present invention relates generally to image processing apparatuses, and more specifically, to an image processing apparatus such as a copying machine and a printer which converts read data into data in reproduced color and forms a multi-color image.

2. Description of the Related Art

In printers which reproduce images in full color, digital image data R, G, and B corresponding to red, green, and blue (primary colors) read from an original is converted into data of three colors for color reproduction, cyan (C), magenta (M) and yellow (Y) (complementary colors) for reproduction of the image.

Therefore, a data processing apparatus for converting digital data in three colors, red, green and blue obtained by scanning an original into three reproduction color data for image reproduction is required.

Black obtained by mixing cyan, magenta, and yellow cannot be reproduced sharp enough by the effect of the spectral characteristic of each toner. Therefore, subtractive color mixing process with reproduction color data Y, M and C and addition of black with black data K are employed to improve the reproducibility of black. In addition, a masking correction with a masking coefficient is conducted in order to compensate for deviation from ideal filter and toner characteristics in reading colors.

It is however difficult to reproduce colors at a low difference in color in the entire range of the color space using a masking coefficient fixed to one kind. A method of dividing the color space into a number of regions and using different masking coefficients for the regions has been suggested. Although color reproducibility is increased by the method, sharp change in masking coefficient at a boundary of colors in the color space can result in harshness or a pseudo-contour.

Thus, a color image processing apparatus has been suggested which has a plurality of matrixes for color correction, conducts color correction of color component signals in parallel using the matrixes, and combines the outputs in a prescribed ratio.

Such a conventional image processing apparatus requires a plurality of circuits for color correction, and therefore the circuit configuration will be complicated. The number of matrixes for color correction corresponding to the color correction circuits is fixed to the number of prescribed color regions, and change in the number of color regions cannot be coped with, and therefore, such an apparatus would not be suitable.

Meanwhile, another image processing apparatus having a color change function has been suggested which identifies a specified color from read data of R, G, and B as input parameters using a table index and changes the color. If such identification of a specified color is made in a binary manner (as whether it belongs to the color or not), however, portions to be converted are discretely generated for colors belonging to boundary portions on the color space and may result in harshness. The pseudo-contour is also inevitably produced.

SUMMARY OF THE INVENTION

It is an object of the present invention to improve the color reproducibility of a color image in an image processing apparatus.

Another object of the present invention is to prevent generation of harshness in a color image in an image processing apparatus.

A further object of the present invention is to prevent generation of a pseudo-contour in an image processing apparatus.

Yet another object of the present invention is to provide a smooth color-change image without any harshness or pseudo-contour in an image processing apparatus.

In order to achieve the above-described objects, an image processing apparatus according to a first aspect of the invention includes first designation means for designating a first color, second designation means for designating a second color, production means for producing a color conversion matrix based on the designated first and second colors, input means for inputting an image signal including color information, and processing means for converting information on the first color included in the input image signal into information on the second color, using the produced conversion matrix.

By thus structured image processing apparatus, any color conversion processing can be readily performed, because the first color information is converted into the second color information using the color conversion matrix.

In order to achieve the above-described objects, an image processing apparatus according to another aspect of the invention includes storage means for storing a membership function indicating to what degree an image signal belongs to a prescribed color region, input means for inputting an image signal, determination means for determining to what degree the input image signal belongs to the prescribed color region, using the membership function stored, calculation means for calculating a masking coefficient based on the determined degree of belonging, and processing means for performing a masking processing of the input image signal based on the calculated masking coefficient.

In thus structured image processing apparatus, color reproducibility is improved, because a masking coefficient is calculated based on a degree of belonging to a prescribed color region according to a membership function.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
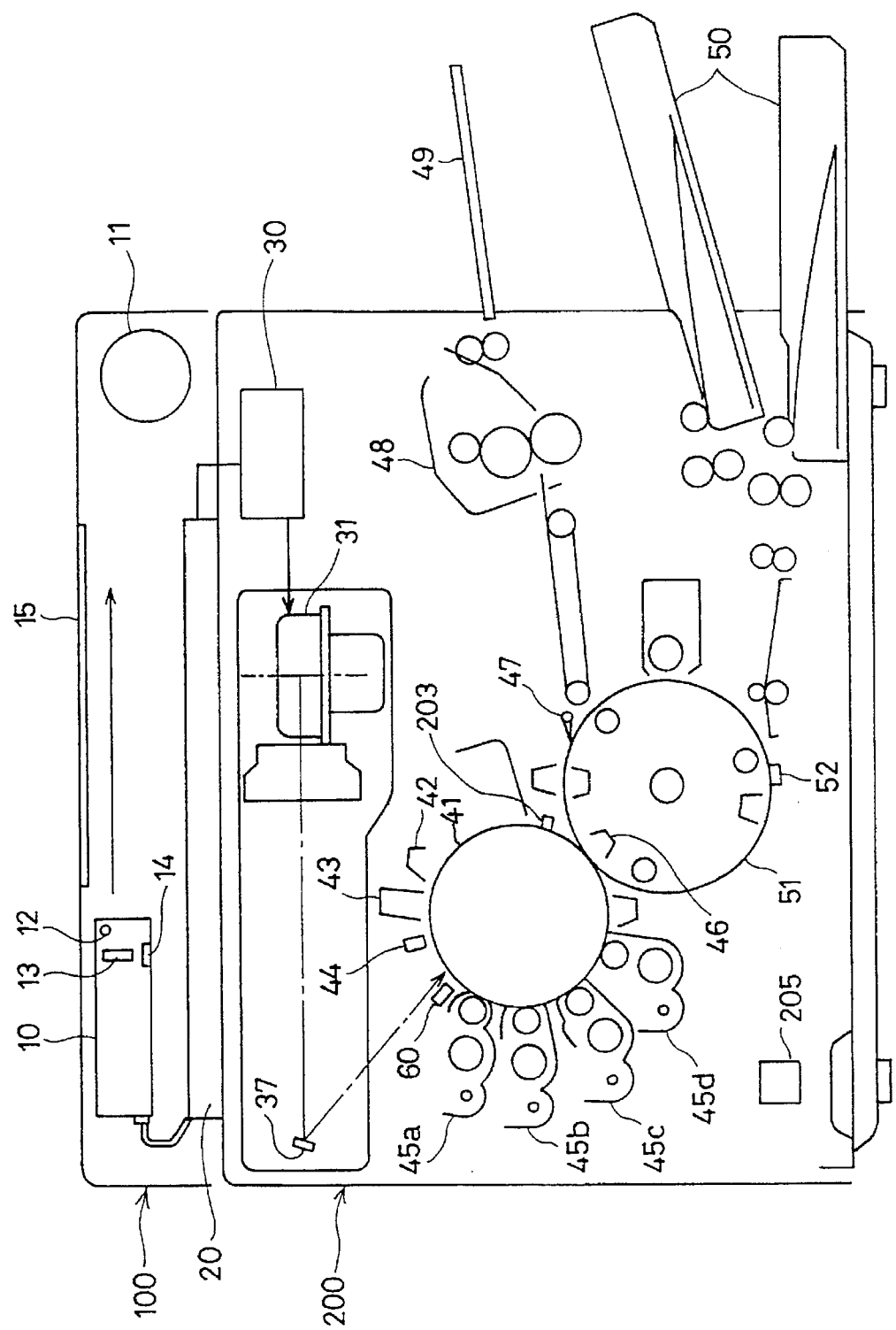
FIG. 1 is a cross sectional view showing the structure of a digital color copying machine according to a first embodiment of the invention.

FIG. 1 is a cross sectional view showing the entire structure of a digital color copying machine according to a first embodiment of the invention. The digital color copying machine is roughly divided into an image reader portion 100 for reading original images, and a main body portion 200 for reproducing images read at the image reader portion.

In FIG. 1, a scanner 10 includes an exposure lamp 12 for irradiating an original with light, a rod lens array 13 concentrating light reflected from the original, a close contact type CCD color image sensor 14 for converting the concentrated light into an electrical signal. Scanner 10 is driven by motor 11 at the time of reading an original, moves in the direction of the arrow (subscanning direction) and scans an original placed on a platen 15. An image on an original irradiated with exposure lamp 12 is subjected to photoelectric conversion by image sensor 14. Multi-value electrical signal including three colors, R, G and B obtained by image sensors 14 is converted into tone data for any of yellow (Y), magenta (M), cyan (C), and black (K). Then, a print head portion 31 subjects the input tone data to correction (γ correction) according to the tone characteristic of a photoreceptor, and a dither processing as desired, and then the image data resulted from the correction is D/A converted to produce a laser diode driving signal. The driving signal drives a laser diode (not shown) in print head portion 31.

A photoreceptor drum 41 driven to rotate through a reflection mirror 37 is exposed with a laser beam emitted from the laser diode based on the tone data, as illustrated in FIG. 1 in the chain dotted line. A latent electrostatic image for the original is thus formed on the photoreceptor of photoreceptor drum 41. Photoreceptor drum 41 is irradiated with an eraser lamp 42 before exposure for every copying and charged through a corona charger 43. Photoreceptor drum 41 is then subject to exposure in this uniformly charged state, and an latent electrostatic image is formed on photoreceptor drum 41 as a result. Among yellow, magenta, cyan, and black toner developers 45a to 45d, the one corresponding to the latent electrostatic image is selected to develop the latent electrostatic image on photoreceptor drum 41. The developed image is transferred onto copying paper rolled around a transfer drum 51.

The above-described development and transfer steps are repeatedly conducted for each of yellow, magenta, cyan and black. At the time, scanner 10 repeats the scanning operation in synchronization with the operations of photoreceptor drum 41 and transfer drum 51. Then, activation of a separation claw 47 separates the copying paper from transfer drum 51, and the paper with the image transferred thereon through a fixing device 48 is discharged on a discharge tray 49. Note that the copying paper is fed from a paper cassette 50 and has its tip end chucked by a chucking mechanism 52 on transfer drum 51, in order to prevent positional deviation over a plurality of transfers.

Figure 2:
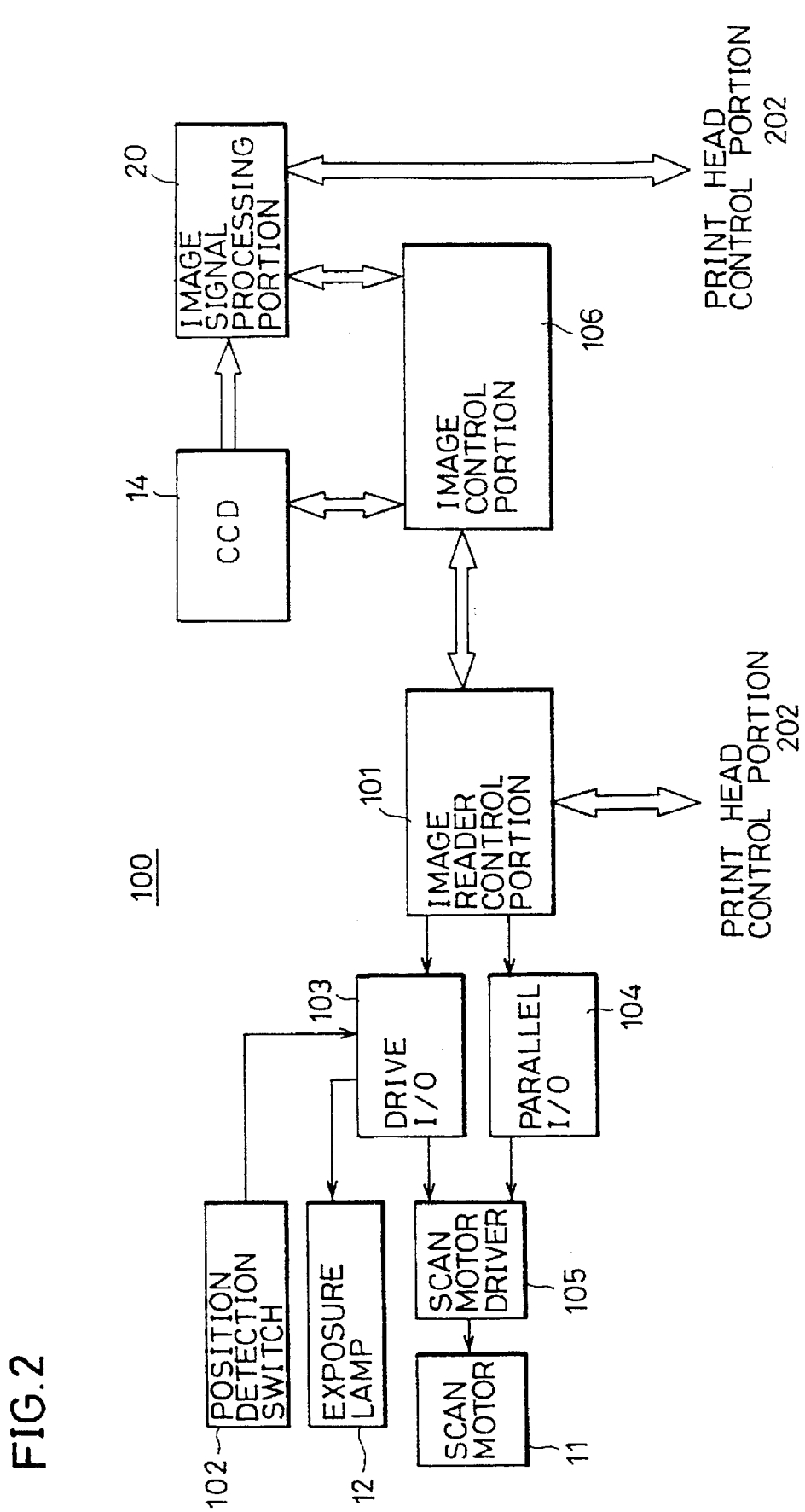
FIG. 2 is a block diagram showing the structure of an image reader portion in the copying machine in FIG. 1.

FIG. 2 is a block diagram showing the entire structure of the image reader portion in the digital color copying machine shown in FIG. 1.

As illustrated in FIG. 2, the entire image reader portion 100 is controlled by an image reader control portion 101. Image reader control portion 101 controls exposure lamp 12 through a drive I/O 103 in response to a detection signal from a position detection switch 102 indicating the position of an original on platen 15, and controls a scan motor driver 105 through drive I/O 103 and a parallel I/O 104. Scan motor 11 is driven by scan motor driver 105.

Meanwhile, image reader control portion 101 is connected to image control portion 106 by a bus. Image control portion 106 and each of CCD color image sensor 14 and image signal processing portion 20 are connected with each other though a bus. An image signal from CCD color image sensor 14 is input to and processed at image signal processing portion 20 which will be described later.

Figure 3:
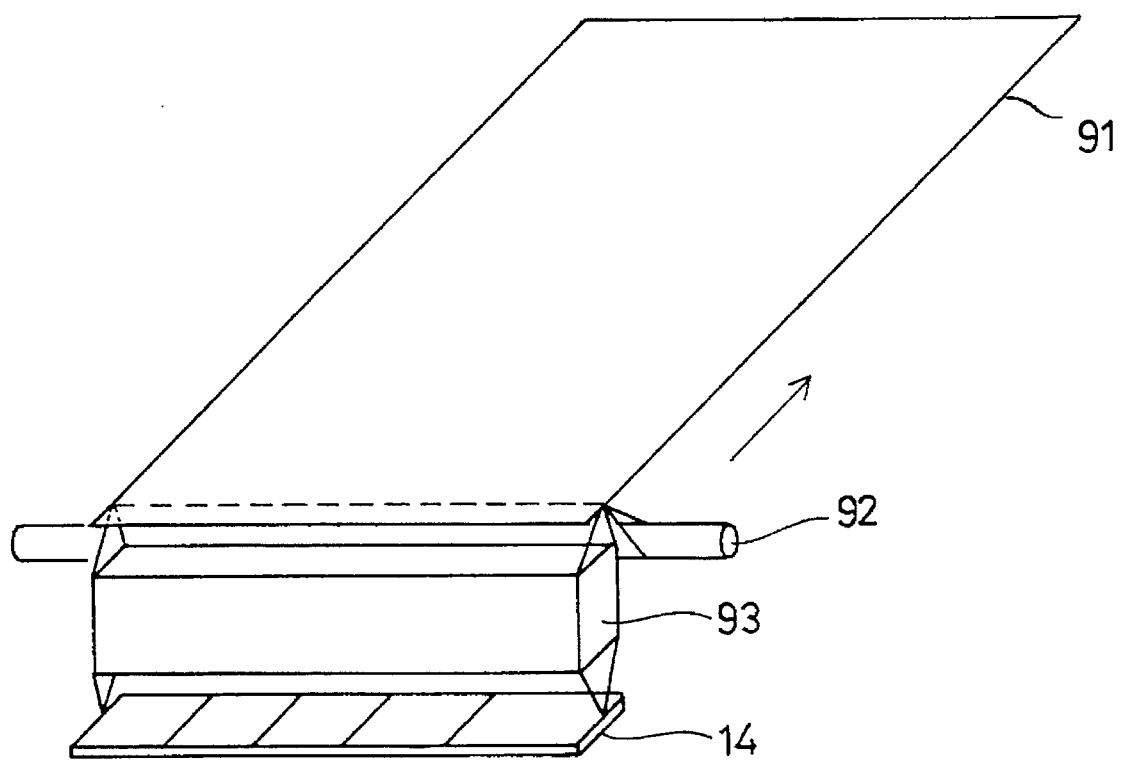
FIG. 3 is a perspective view showing the structure of a reading portion in the copying machine in FIG. 1.

FIG. 3 is a perspective view showing the image reading portion in FIG. 1.

In the image reading portion, a surface of an original 91 is irradiated with a light source (halogen lamp) 92 giving a relative spectral distribution of three wavelengths (R, G, B) and light reflected therefrom forms an equal size image in line with respect to the light receiving surface of close-contact type CCD color image sensor 14 with rod lens array 93. The optics including rod lens array 93, light source 92, and CCD color image sensor 14 is line-scanned, and optical information on original 91 is converted into electrical signals by CCD color image sensor 14.

Figure 4:
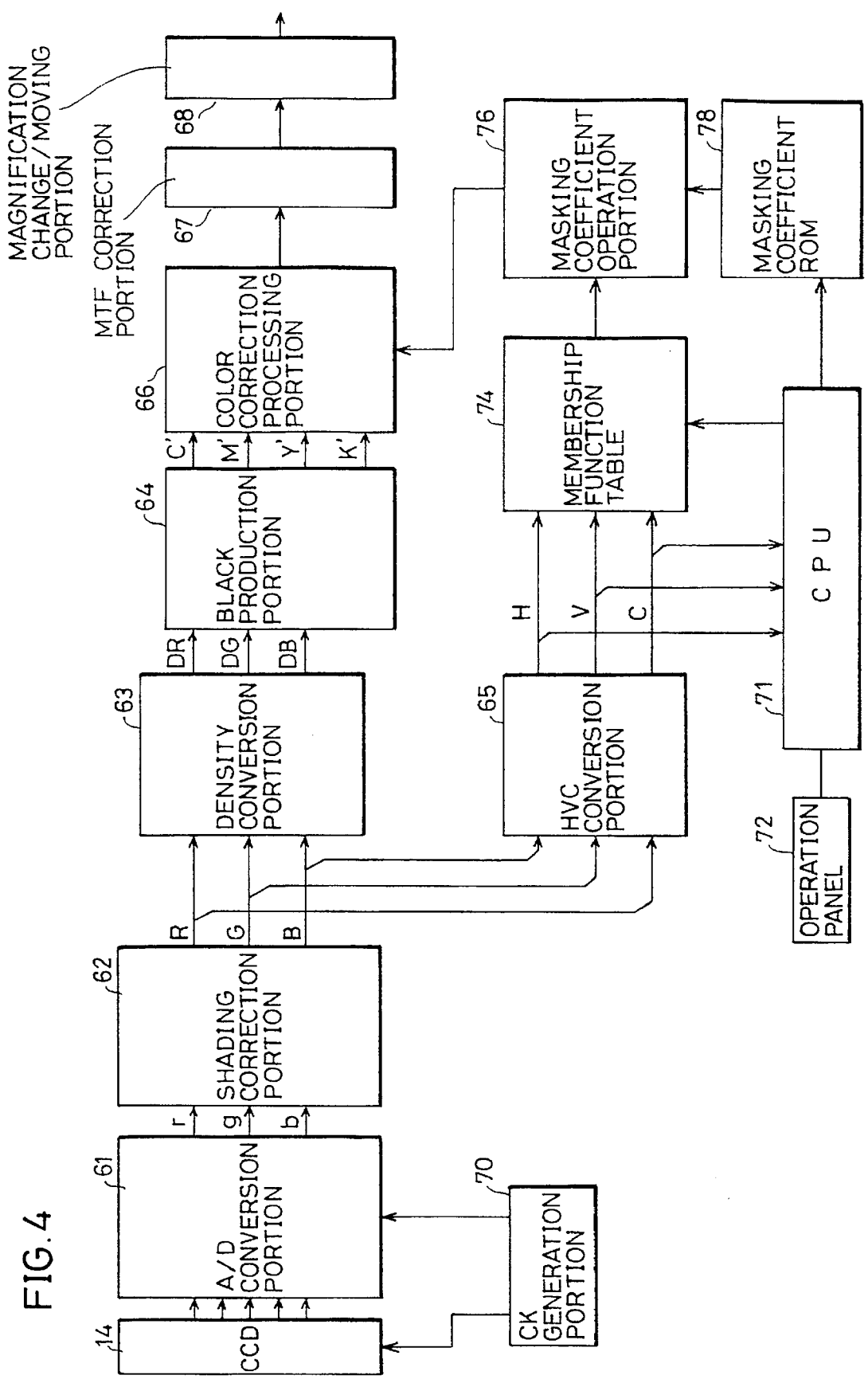
FIG. 4 is a block diagram showing the structure of an image signal reading portion in FIG. 2.

FIG. 4 is a block diagram showing image signal processing portion 20 in FIG. 2.

In FIG. 4, the image signals produced by photoelectric conversion with CCD color image sensor 14 are analog signals, which are converted into 8-bit digital signals r, g, and b by an A/D conversion portion 61 at a succeeding stage.

Each dot of CCD image sensor 14 has variance in sensitivity, which also varies due to difference between color separation signals r, g, and b. In order to eliminate such variance in sensitivity, a shading correction portion 62 corrects the digital signals such that the read level of each dot is fixed when white and black image data as a reference is read, and outputs read reflection data R, G, and B to a density conversion portion 63 and an HVC conversion portion 65.

Note that a clock generation portion 70 generates and transfers a clock to CCD image sensor 14 and A/D conversion portion 61.

Density conversion portion 63 converts data output from CCD color image sensor 14 into data having a linear characteristic relative to the density of original (OD) viewed with human eyes. The output of CCD color image sensor 14 has a photoelectric conversion characteristic linear to the intensity of input (=original reflectance OR). Meanwhile, the relation "–logOR=OD" is established between original reflectance (OR) and original density (OD). The non-linear reading characteristic of CCD color image sensor 14 is converted into a linear characteristic, using a reflectance/density conversion table (not shown). More specifically, using the reflectance/density conversion table, R, G and B read data of a target pixel is converted into density data DR, DG and DB.

Data C', M', Y' and K' corresponding to cyan, magenta, yellow, and black necessary for full color reproduction is produced for every scan according to the field sequential system, and full color reproduction is implemented by four scannings all together. Black is also printed, because combining cyan, magenta, and yellow cannot reproduce sharp black by the effect of the spectral characteristics of the toner. In the full color copying machine according to the embodiment, black reproducibility is improved by the subtractive color mixing process with data Y', M', and C' and additive printing of black with black data K' and full color is thus implemented.

Figure 5:
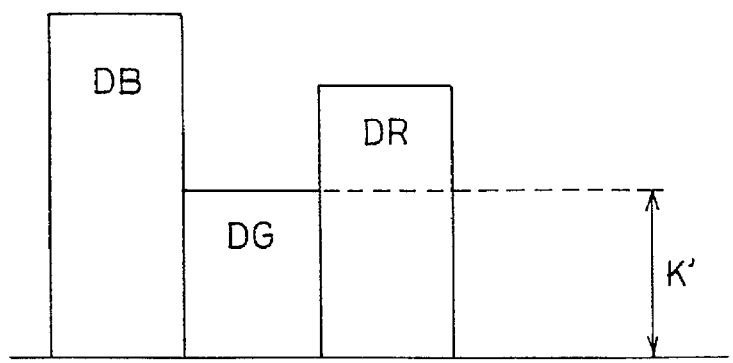
FIG. 5 is a representation for use in illustration of a method of producing black data K'0 in a black producing portion in FIG. 4.

A black production portion 64 produces the amount of black K from components R, G and B corresponding to red, green and blue in reflection data indicating brightness on an original. DR, DG, and DB obtained from density conversion portion 63 is density data for R, G and B components, and therefore matches cyan, magenta, and yellow components which are complementary colors to the read R, G and B. Cyan, magenta, and yellow components equal in amount are combined to produce black. Accordingly, as illustrated in FIG. 5, a minimum value among DR, DG, and DB (DG in this case) is at least included in each component and therefore this minimum value can be used as black data K'. Black production portion 64 detects black data K'=MIN (DR, DG, DB).

Figure 6:
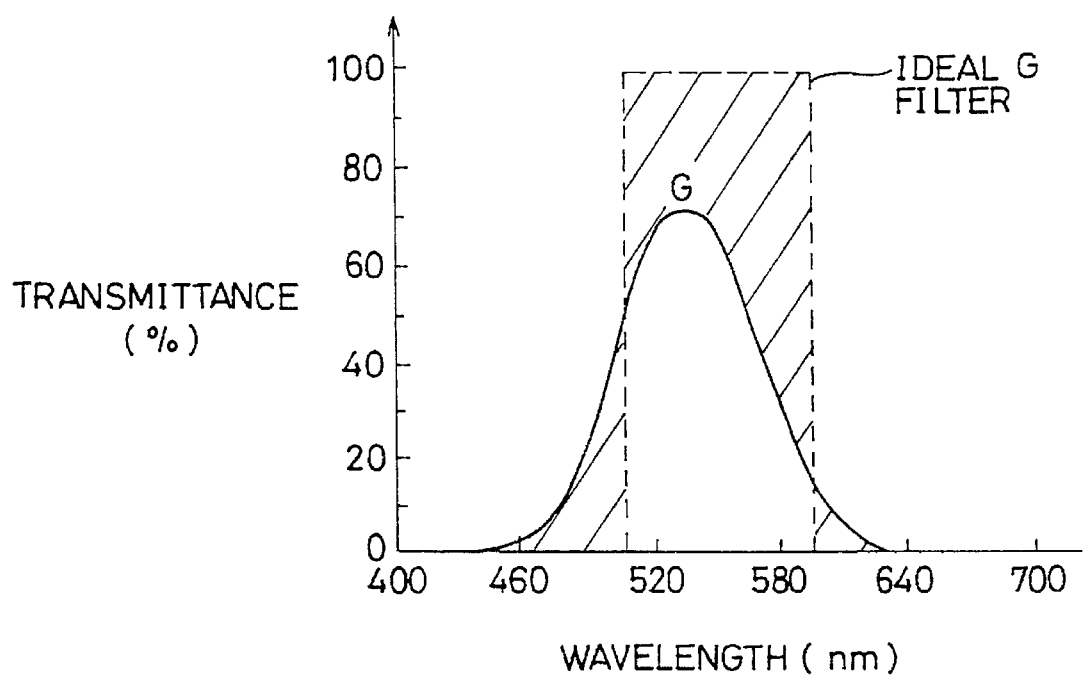
FIG. 6 is a graph showing the transmittance of a G filter for use in illustration of the first embodiment of the invention.
Figure 7:
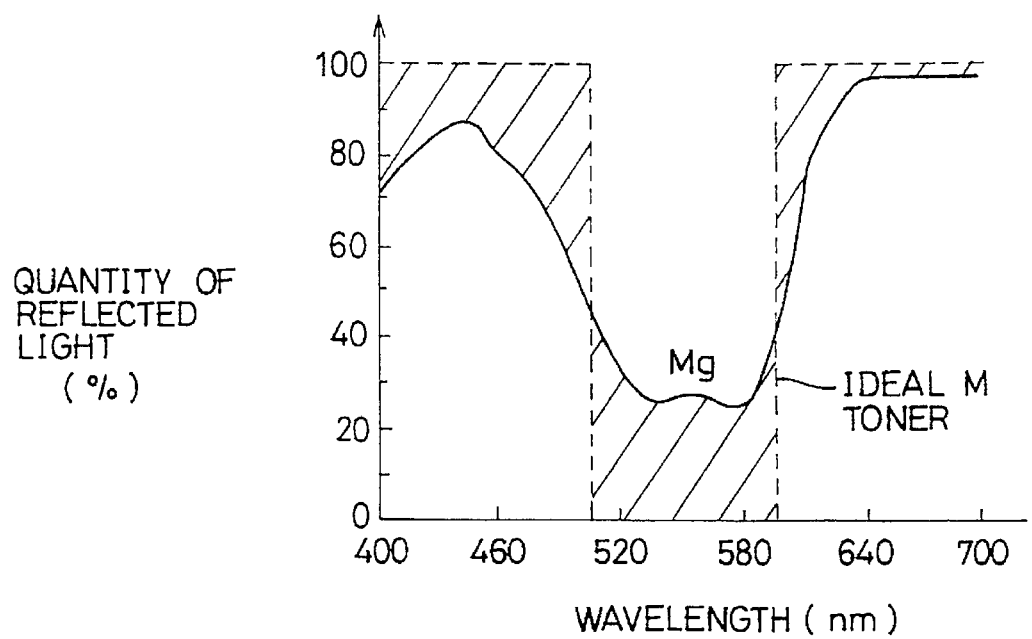
FIG. 7 is a graph showing the reflection characteristic of M toner for use in illustration of the first embodiment of the invention.

A color correction processing portion 66 corrects the transmittance of each filter R, G and B in CCD color image sensor 14 and the reflectance of each toner C, M, and Y in the printer portion so that they approximate to their ideal reproducibilities. Here, a G filter and M toner will be described by way of example. The transmittance of the G filter in FIG. 6 and the reflectance of M toner in FIG. 7 have wavelength regions as shadowed which are below ideal characteristics. Color correction processing portion 66 conducts a linear correction according to the following masking equation together with the black addition processing described above. Note that since printing is sequentially conducted for every field of a line, the masking equation applies to every line.

Color correction processing portion 66 is formed of a black addition portion and a color correction masking portion. At the black addition portion, black data K' is multiplied by a UCR coefficient $(-\alpha)$ in an under color removal control for printing C, M, and Y. The value resulted from the multiplication $(-\alpha \cdot K')$ is added to correction data DR, DG and DB, and the result of addition is output as under-color removal values C', M', and Y'. Meanwhile, in black addition control, black data K' is multiplied by a BP coefficient $\beta$ and the value resulted from the multiplication $(\beta \cdot K')$ is output.

At the color correction masking portion, a linear masking processing which requires a simple circuit configuration is employed, and in an under color removal control, data C', M', and Y' are multiplied by masking coefficients ($A_1 \sim A_3$, $A_4 \sim A_6$, $A_7 \sim A_9$) from a masking coefficient operation portion. And the values resulted from the multiplication are added up for output.

This embodiment of the invention employs the field sequential system including four scannings. Accordingly, an output from color correction processing portion 66 for one scanning corresponds to one of C, M, Y, and K, and K $(=\beta \cdot K')$ is directly output without performing the above-described linear masking operation.

An MTF correction portion 67 conducts a space filtering processing to data including a target pixel and peripheral pixels for smoothing and edge enhancement.

The image data is further edited by a magnification change/moving portion 68 for output to an image signal output portion.

The aforementioned is a basic flow from reading of an image to output of an image signal at the image signal processing portion.

Now, a processing as far as determination of a masking coefficient will be described.

As in the foregoing, multi-value digital signals corresponding to R, G, and B output from shading correction portion 62 are sent in parallel to each of density conversion portion 63 and HVC conversion portion 65, respectively. HVC conversion portion 65 produces H (hue), V (lightness), and C (saturation) from the R, G, and B signals.

Figure 8:
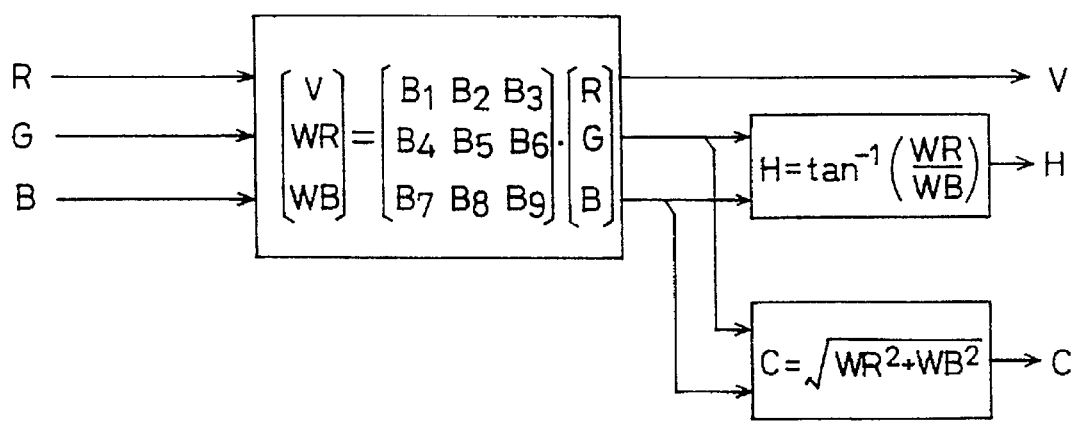
FIG. 8 is a representation showing the content of a processing in an HVC conversion portion in FIG. 4.

FIG. 8 illustrates an example of the content of a processing at HVC conversion portion 65.

R, G, and B signals are converted into (V, WR, WB) by a matrix operation of 3×3 n (n=1, 2, ...) (n=1 in this example), and then H and C are calculated based on WR and WB. H, V, and C may be produced using a conversion table in place of such a matrix operation. Note that data corresponding to the three attributes in the equal color space may be used in place of (V, WR, WB).

An ROM 78 for masking coefficients stores an optimization masking coefficient $MSX_X$ corresponding to a plurality of reference color groups. In this embodiment, a linear masking matrix of 3×3 as follows is stored, and colors set as reference colors X include C (cyan), M (magenta), Y (yellow), R (red), G (green) and B (blue).

$$MSK_X = \begin{bmatrix} A_1 & A_2 & A_3 \\ A_4 & A_5 & A_6 \\ A_7 & A_8 & A_9 \end{bmatrix} \quad (1)$$

$X = C, M, Y, R, G, B$

Figure 9:
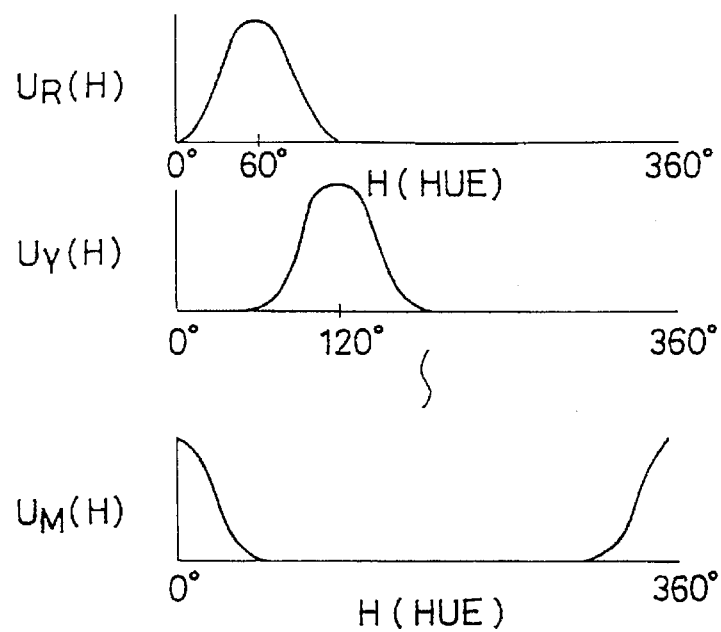
FIG. 9 is a graphic representation showing examples of membership functions stored in a membership function table in FIG. 4.
Figure 10:
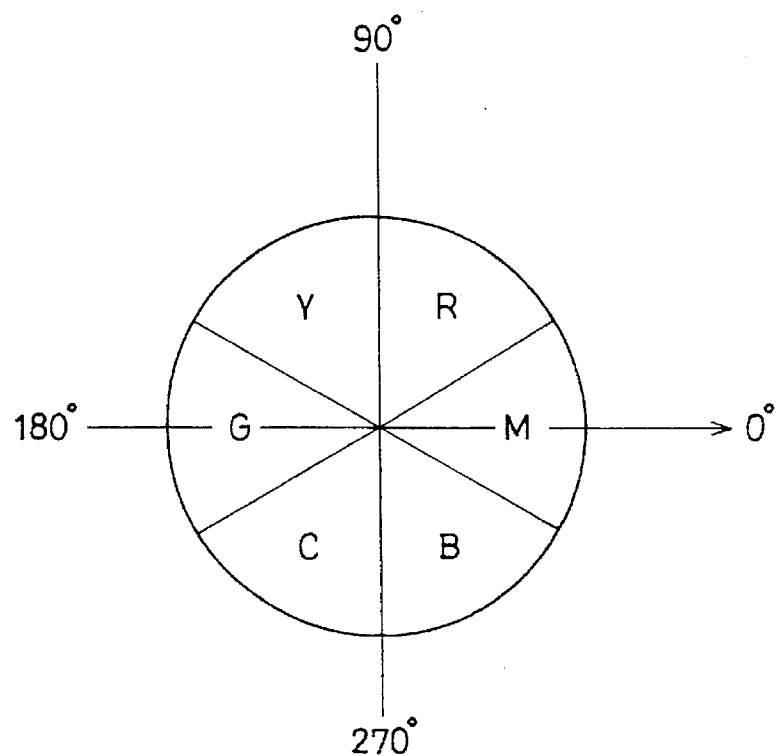
FIG. 10 is a representation showing the state of distribution of colors in the color space in association with the membership functions in FIG. 9.

Membership function table 74 stores H, V, and C membership functions for each reference color as illustrated in FIG. 9 (in the figure, membership functions for H with respect to reference colors R, Y and M are shown). Note that FIG. 10 illustrates the state of distribution of the reference color in the color space corresponding to FIG. 9.

Although the membership function is expressed as a function only for H (=hue) as the simplest example, H, V, and C may be combined to produce the following functions:

$$U_X = U_X(H, V, C)$$

or $$U_X = U_X(H) \cdot U_X(V) \cdot U_X(C). \quad (1)$$

A membership function only for V or only for C may be used instead of H.

Masking coefficient operation portion 76 calculates an appropriate masking coefficient MSK from a masking coefficient $MSK_X$ for each reference color, and an output value $U_X$ (H) from membership function table 74 which is produced from the H, V, and C values of a target pixel, based on the following equation:

$$MSK = \frac{\sum_X U_X(H) \cdot MSK_X}{\sum_X U_X(H)} \quad (2)$$

Calculation of a masking coefficient will be described by way of example in conjunction with equation (2).

Figure 11:
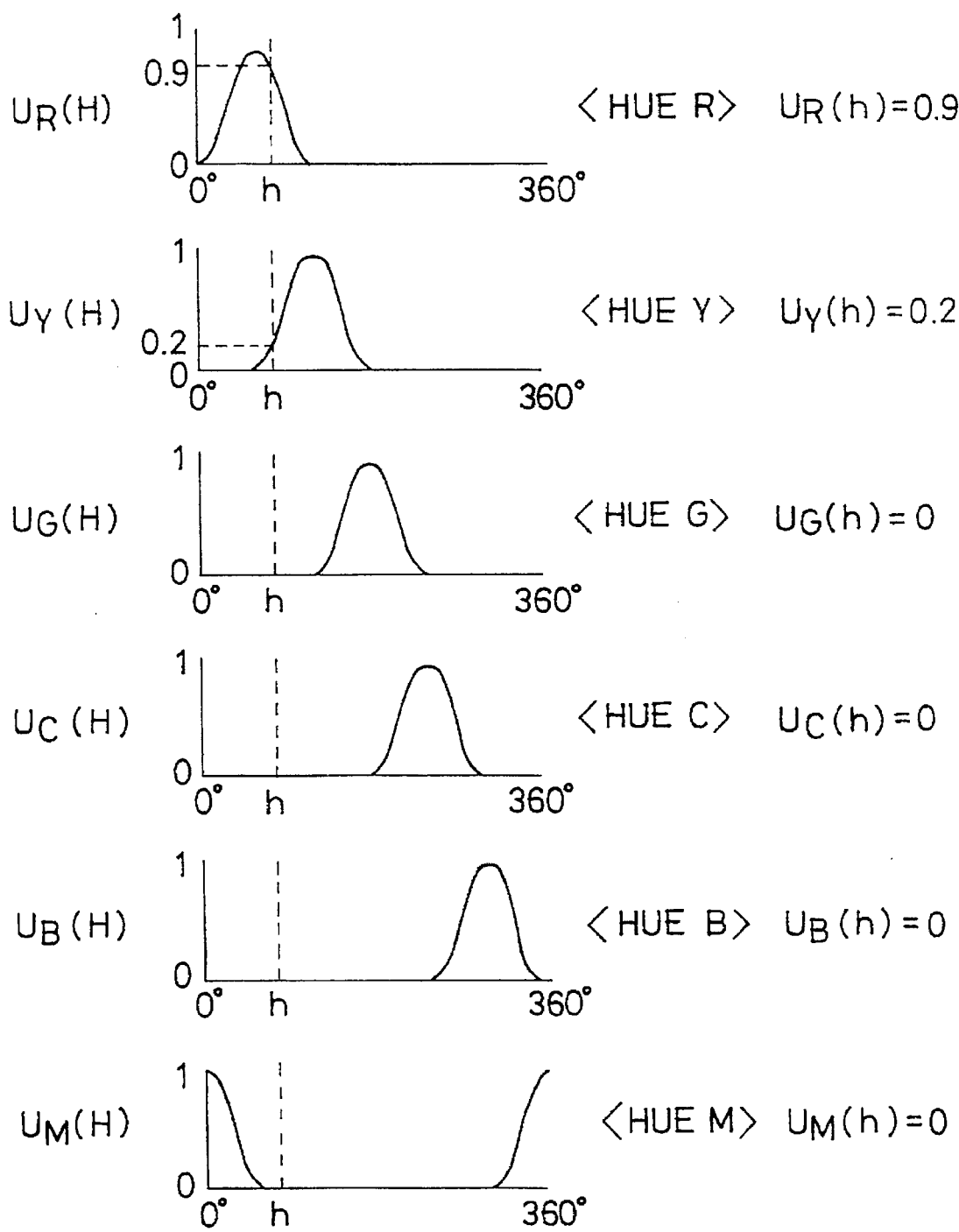
FIG. 11 is a graphic representation showing specific examples of operations for producing masking coefficients in the first embodiment of the invention.

The color space H=0° obtained by an HVC conversion corresponds to a hue possessed by a so-called M (magenta), color region. Now, assume that membership functions $U_R$ (H), $U_Y$ (H), $U_G$ (H), $U_C$ (H), $U_B$ (H) and $U_M$ (H) are sequentially set for hues H=0° to 360° (see FIG. 10) as shown in FIG. 11.

The membership functions will be $U_R$ (h)=0.9, $U_Y$ (h)= 0.2, and $U_X$(h)=0 (X=G, C, B, M) for a hue signal h obtained from the R, G, and B of a target pixel through an HVC conversion. More specifically, these values are output from membership function table 74 in response to the value of h. Meanwhile, the following functions $MSK_R$, $MSK_Y$, $MSK_G$, $MSK_C$, $MSK_B$ and $MSK_M$ are, for example, output from masking coefficient ROM 78 to masking coefficient operation portion 76.

$$MSK_R = \begin{bmatrix} 1.85 & -0.76 & 0.05 \\ -0.50 & 2.00 & -0.72 \\ 0 & -0.62 & 1.63 \end{bmatrix}$$

$$MSK_Y = \begin{bmatrix} 1.70 & -0.4 & -0.03 \\ -0.50 & 1.77 & -0.29 \\ 0.2 & -0.8 & 1.90 \end{bmatrix}$$

$$MSK_G = \begin{bmatrix} 1.52 & -0.62 & -0.03 \\ -0.72 & 1.82 & -0.09 \\ -0.05 & -1.00 & 1.98 \end{bmatrix}$$

$$MSK_C = \begin{bmatrix} 1.44 & -0.36 & 0.10 \\ -0.74 & 1.85 & -0.17 \\ 0.25 & -0.79 & 1.99 \end{bmatrix}$$

$$MSK_B = \begin{bmatrix} 1.85 & -0.64 & 0.08 \\ -0.60 & 1.87 & -0.20 \\ 0 & -0.7 & 1.49 \end{bmatrix}$$

$$MSK_M = \begin{bmatrix} 1.54 & -0.43 & -0.1 \\ -0.40 & 2.00 & -0.39 \\ 0 & -0.81 & 1.29 \end{bmatrix}$$

At masking coefficient operation portion 76, each masking coefficient and each membership function value are substituted based on expression (2) as follows.

$$MSK = \frac{0.9 \times MSK_R + 0.2 \times MSK_Y + 0 \times MSK_G + 0 \times MSK_C + 0 \times MSK_B + 0 \times MSK_M}{0.9 + 0.2 + 0 + 0 + 0 + 0}$$

As a result final masking coefficients are determined as follows.

$$MSK_K = \begin{bmatrix} 1.82 & -0.69 & 0.04 \\ -0.50 & 1.96 & -0.64 \\ 0.04 & -0.65 & 1.68 \end{bmatrix}$$

C, M, and Y output to MTF correction portion 67 are produced as follows.

$$\begin{bmatrix} C \\ M \\ Y \end{bmatrix} = \begin{bmatrix} 1.82 & -0.69 & 0.04 \\ -0.50 & 1.96 & -0.64 \\ 0.04 & -0.65 & 1.68 \end{bmatrix} \begin{bmatrix} C' \\ M' \\ Y' \end{bmatrix}$$

While the field sequential process is employed as in the embodiment, the following processes may be employed:

output from masking coefficient ROM 78 to masking coefficient operation portion 76 is, the first line of masking coefficient, in other words only $A_1$, $A_2$ and $A_3$, when C (cyan) is calculated, the second line of masking coefficient, in other words only $A_4$, $A_5$, and $A_6$, when M (magenta) is calculated, or the third line of masking coefficient, in other words only $A_7$, $A_8$, and $A_9$, when Y (yellow) is calculated, and the coefficient resulted from the calculation may be transferred to color correction processing portion 66.

The circuit configuration of masking coefficient operation portion 76 may be simplified if $U_X(H)$ is so set that the denominator in expression (2) is always "1".

Great change in H due to local variance of data R, G, and B could greatly change masking coefficients and harshness or a pseudo-contour in an image may result. This can be effectively prevented by setting a smoothing processing portion in a preceding or succeeding stage to the HVC conversion portion.

Now, a second embodiment of the invention will be described.

Membership functions corresponding to color regions are preferably rendered variable, in order to enhance or suppress any color region to produce a desired color image.

Figure 12:
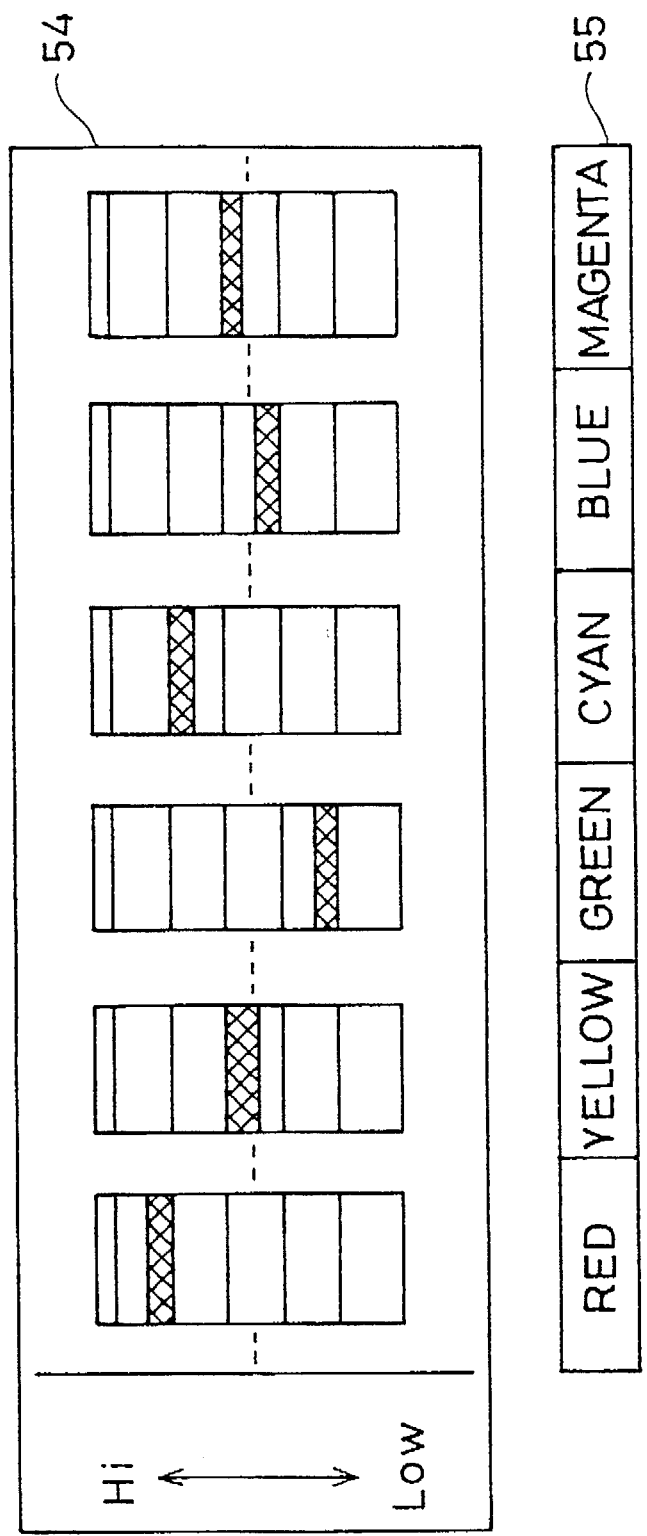
FIG. 12 is a view showing a display portion provided at an operation panel for changing the value of membership function of each color according to a second embodiment of the invention.

FIG. 12 is an example of a display portion on an operation panel provided for such a purpose.

Figure 13:
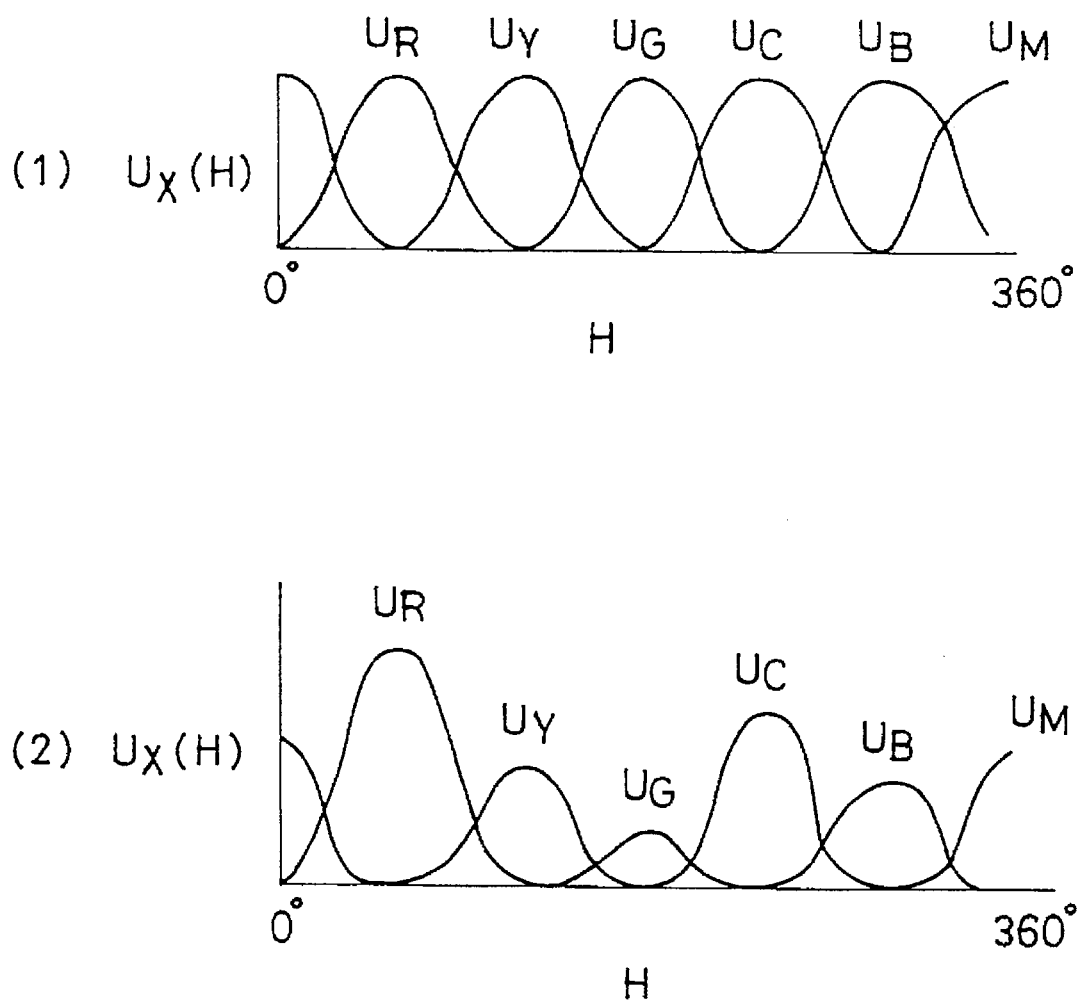
FIG. 13 shows at (1) a setting for a standard membership function, and at (2) the state in which the value of membership function is changed between the colors by operating the display portion in FIG. 12, both corresponding to the display portion in FIG. 12.

More specifically, operation of a color bar 55 corresponding to each color provided on the display portion 54 of the operation panel can change standard membership functions shown in FIG. 13 at (1) into those shown at (2) in FIG. 13. Thus, a color image with a desired color enhanced or suppressed may be readily obtained.

Thus, (2) in FIG. 13 means that $K_X \cdot U_X(H)$ ($K_X$: when the color bar is operated to move the settings on the operation panel in the direction of "Hi", for example, with a certain multiplier which is 1 at standard times, $K_X$ increases) is regarded as a new membership function.

More specifically, the masking coefficient is produced by the following equation:

$$MSK = \frac{\sum K_X \cdot U_x \cdot MSK_X}{\sum U_X} \quad (3)$$

Thus determining the masking coefficient can make such a control that the color of a color region with larger $K_X$ will have larger output data and becomes deeper, while the color of a color region with smaller $K_X$ will have smaller output data and becomes lighter as a result. Operation panel setting portions as shown in FIG. 12 may be prepared for C, M, and Y regions, and $K_{CX}$, $K_{MX}$, and $K_{YX}$ may be given depending upon each setting state. In this case, when the first line of MSK is calculated, $K_{CK}$ is used, as expressed as follows.

$$MSK = \frac{\Sigma K_{CX} \cdot U_X \cdot MSK_X}{\Sigma U_X} \quad (4)$$

While the second and third lines are calculated with $K_{MX}$ and $K_{YX}$, and then C, M, and Y components, in other words tone can be adjusted for every regions without affecting other regions.

The following expression may be used in placed of expression (3) to produce MSK.

$$MSK = \frac{\Sigma K_X \cdot U_X \cdot MSK_X}{\Sigma K_X \cdot U_X} \quad (5)$$

Figure 14:
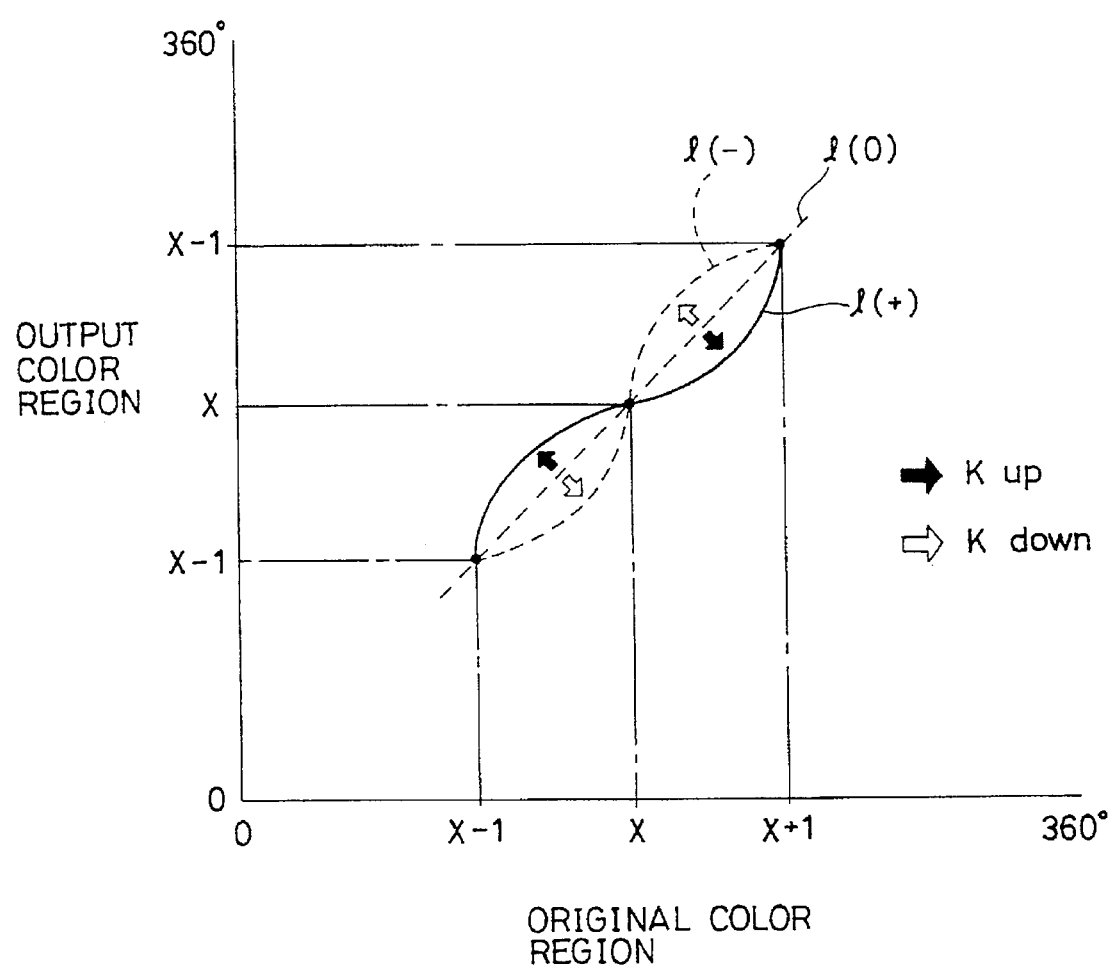
FIG. 14 is a graph showing the change of an output image when the value of $K_X$ in the expression corresponding to expression (5) according to the second embodiment of the invention is changed.

At the time, as illustrated in FIG. 14, when a value $K_X$ with respect to a certain color region X is changed with respect to values $K_{X-1}$ and $K_{X+1}$ for hues X−1 and X+1 adjacent to X, relatively increasing $K_X$ directs the output of an output image with respect to a hue between X−1 and X+1 toward 1 (+) characteristic, while relatively decreasing $K_X$ directs the output toward 1 (−) characteristic, and color adjustment for the color region can be thus implemented.

Now, a third embodiment of the invention will be described.

Figure 15:
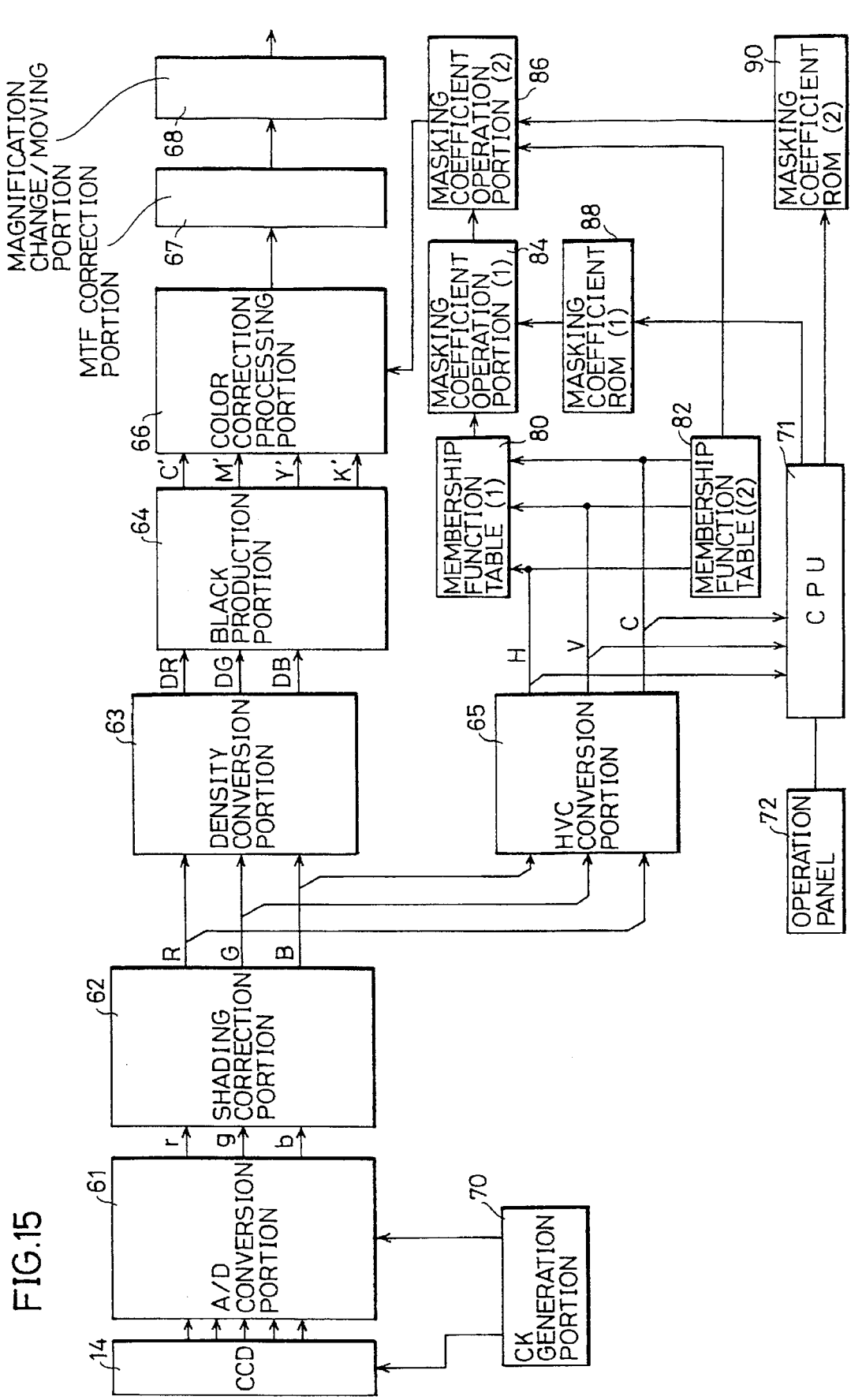
FIG. 15 is a block diagram showing the structure of an image signal processing portion according to a third embodiment of the invention.

FIG. 15 is a block diagram showing the structure of an image signal processing portion according to the embodiment, and in the following, portions in common with the first embodiment described in conjunction with FIG. 4 will not be described again, and portions different from the first embodiment will be mainly described.

In the figure, masking coefficients for reference colors C, M, Y, R, G, and B as described in the foregoing embodiment are stored in a masking coefficient ROM (1) 88, and membership functions corresponding to the color regions of these reference colors are stored in a membership function table (1) (80). A masking coefficient operation portion (1) 84 operates a masking coefficient in the same manner as described in conjunction with the foregoing embodiment.

Figure 16:
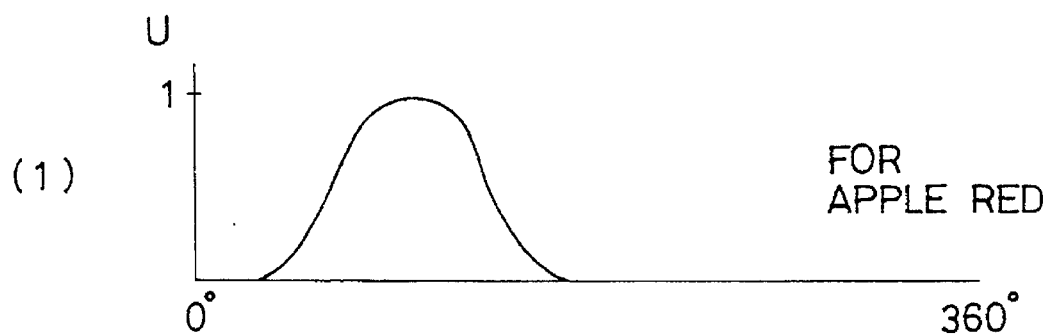
FIG. 16 is a graphic representation showing examples of membership functions for specified colors stored in membership function table (2) in FIG. 15.
Figure 16:
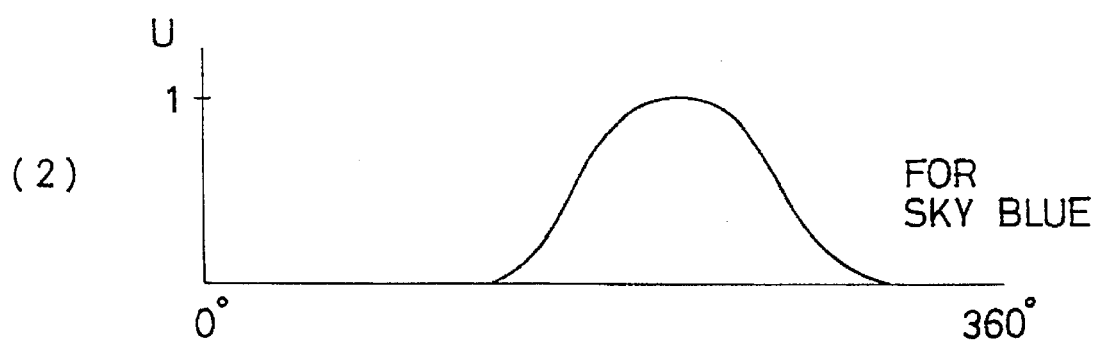
Figure 16:
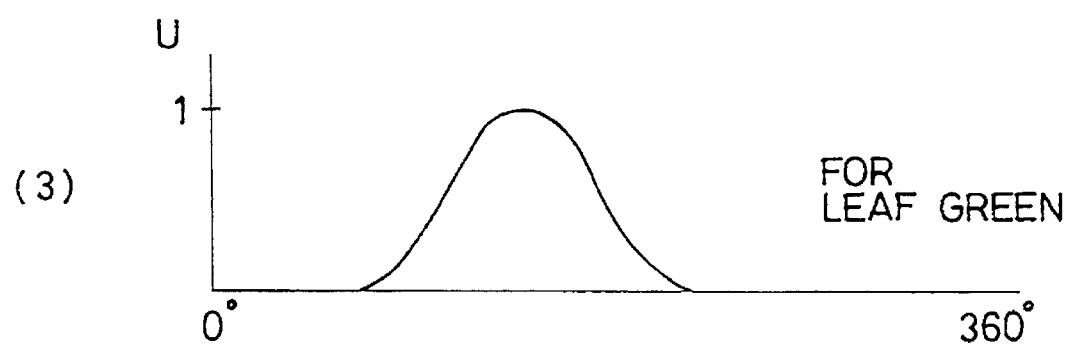

Meanwhile, a masking coefficient ROM (2) 90 stores masking coefficients for specified colors other than the reference colors. So-called memory colors such as "apple red", "sky blue", "leaf green" and the like are set for the specified colors. "Preferred colors" are present for these colors. Masking coefficients for specified colors are provided to reproduce these colors more preferably. Membership function table (2) 82 stores membership functions corresponding to the color regions of the specified colors as shown in FIG. 16. If an instruction for processing taking into account a specified color is given, a masking coefficient is once again operated and set in masking coefficient operation portion (2) 86, based on a masking coefficient operated at masking coefficient operation portion (1) 84 and data stored in membership function table (2) 82 and masking coefficient ROM (2) 90. With the set masking coefficient, a desired color correction processing is conducted.

If there is not any instruction taking into account a specified color, masking coefficient operation portion (2) 86 does not perform any substantial operation, and a masking coefficient operated at masking coefficient operation portion (1) 84 is output to color correction processing portion 66. More specifically, a processing result the same as the first embodiment is obtained.

Note that selection of either a specified color mode taking into account a specified color or a standard color mode for standard colors only may be made on operation panel 72.

Figure 17:
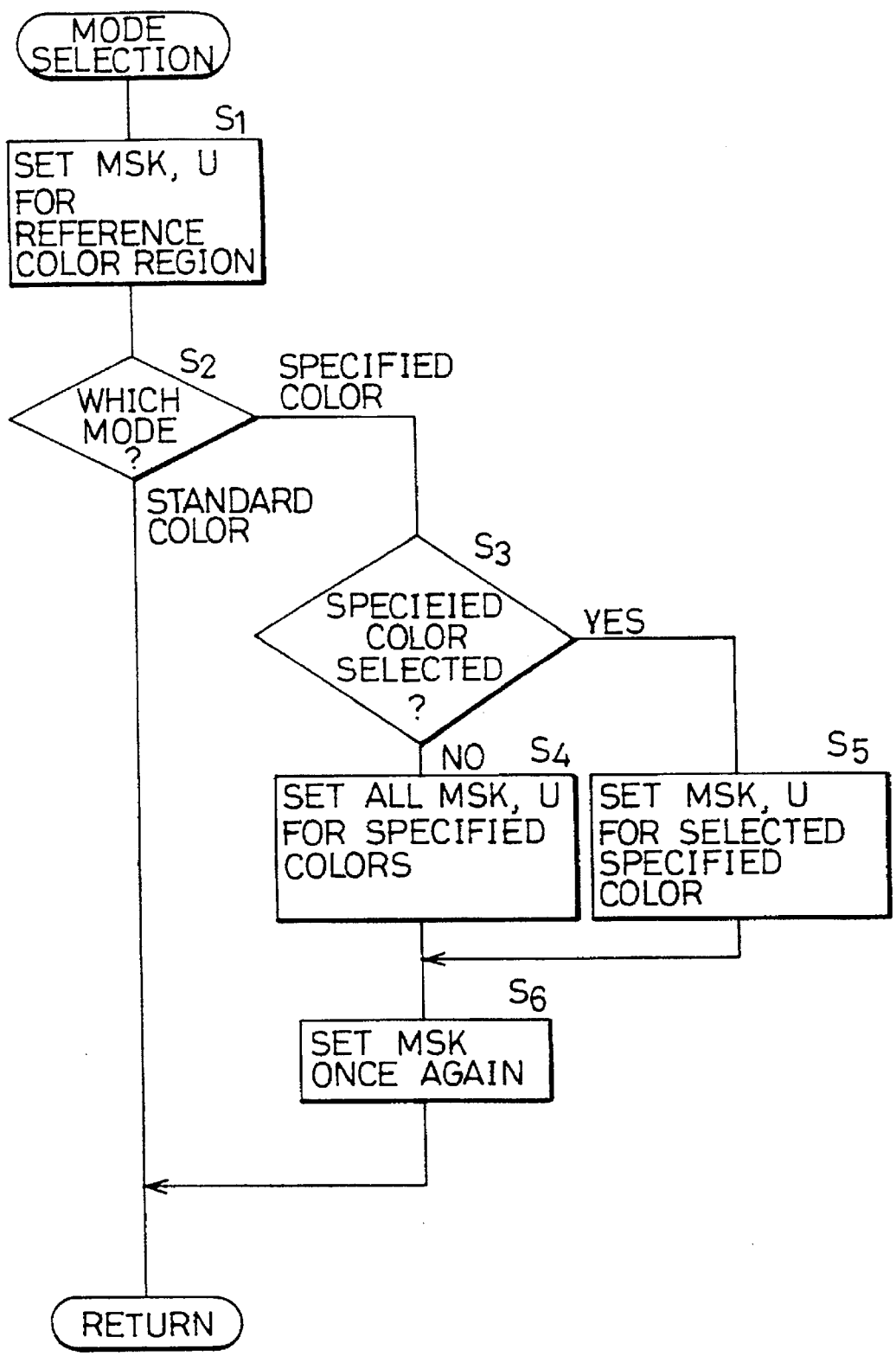
FIG. 17 is a flow chart specifically showing the content of a mode selection routine according to the third embodiment of the invention.

FIG. 17 is a flow chart for use in illustration of the content of control by CPU 71 in response to such a mode selection.

When a mode selection routine is entered, in step S1, a masking coefficient MSK for reference color region and a membership function U are set. In step S2, it is determined whether the selected mode is the specified color mode or the standard color mode. If the selected mode is the standard color mode, the flow returns maintaining the masking coefficient set in step S1.

Meanwhile, if the selected mode is the specified color mode, in step S3, it is determined which color among the specified colors is selected. If no color is selected, in step S4, masking coefficient MSK and membership functions U preselected for specified colors are all set, and in step S6 a masking coefficient is set again based on the set masking coefficients and then the flow returns. If a certain color among the specified colors is selected in step S3, in step S5, a masking coefficient MSK and a membership function U are set for the selected specified color, and then in step S6, the flow returns after a masking coefficient is set once again.

Figure 18:
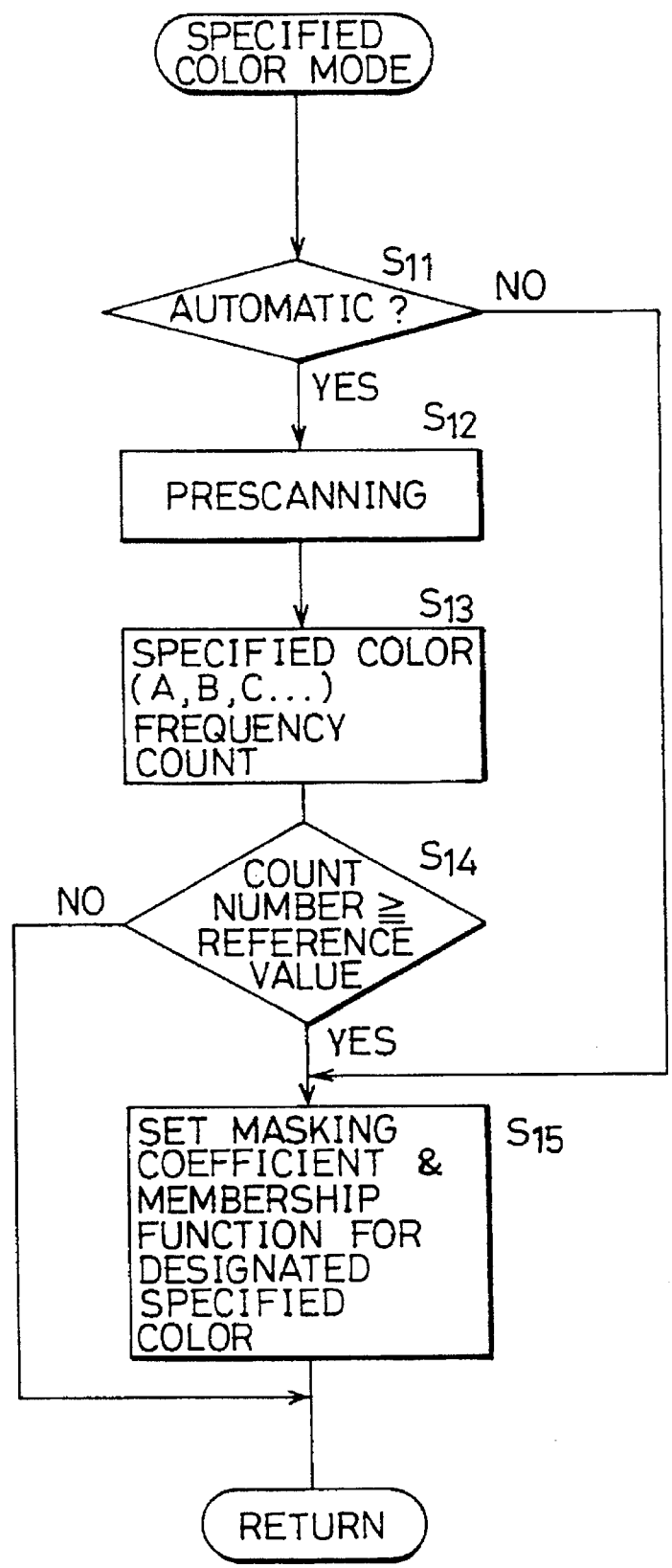
FIG. 18 is flow chart specifically showing the content of a specified color mode routine according to a fourth embodiment of the invention.

FIG. 18 is a flow chart for use in illustration of the content of control by CPU 71 according to a fourth embodiment of the invention. More specifically, if the specified color mode is selected in the third embodiment, it is automatically determined whether or not to conduct a processing taking into account a specified color depending upon the state of an image.

In this case, when the specified color mode routine is entered, in step S11, it is determined whether or not to automatically take into account the specified color. If the automatic mode is not set, the flow jumps to step S15, a masking coefficient is set once again with a masking coefficient and a membership function for the specified color and then the flow returns.

Meanwhile, if the automatic mode is selected in S11, in steps S12 the image is prescanned. More specifically, such prescanning permits the state of distribution of H, V, and C in the original to be detected before entering into an image processing. In step S13, the number of pixels treated as the color region of the specified color is counted. In step S14, it is determined whether or not the counted number of pixels is equal to or larger than a reference value. If the count number is equal to or larger than the reference value, in step S15, a masking coefficient is set once again with the masking coefficient and the membership function for the specified color. If the count number is less than the reference value, it is determined that a processing in the specified color mode is not necessary, and the flow returns skipping step S15.

Note that the way of setting a masking coefficient once again in this embodiment is the same as in the third embodiment.

Now, a fifth embodiment of the present invention will be described. This embodiment is directed to an image processing apparatus having a color change function.

Figure 19:
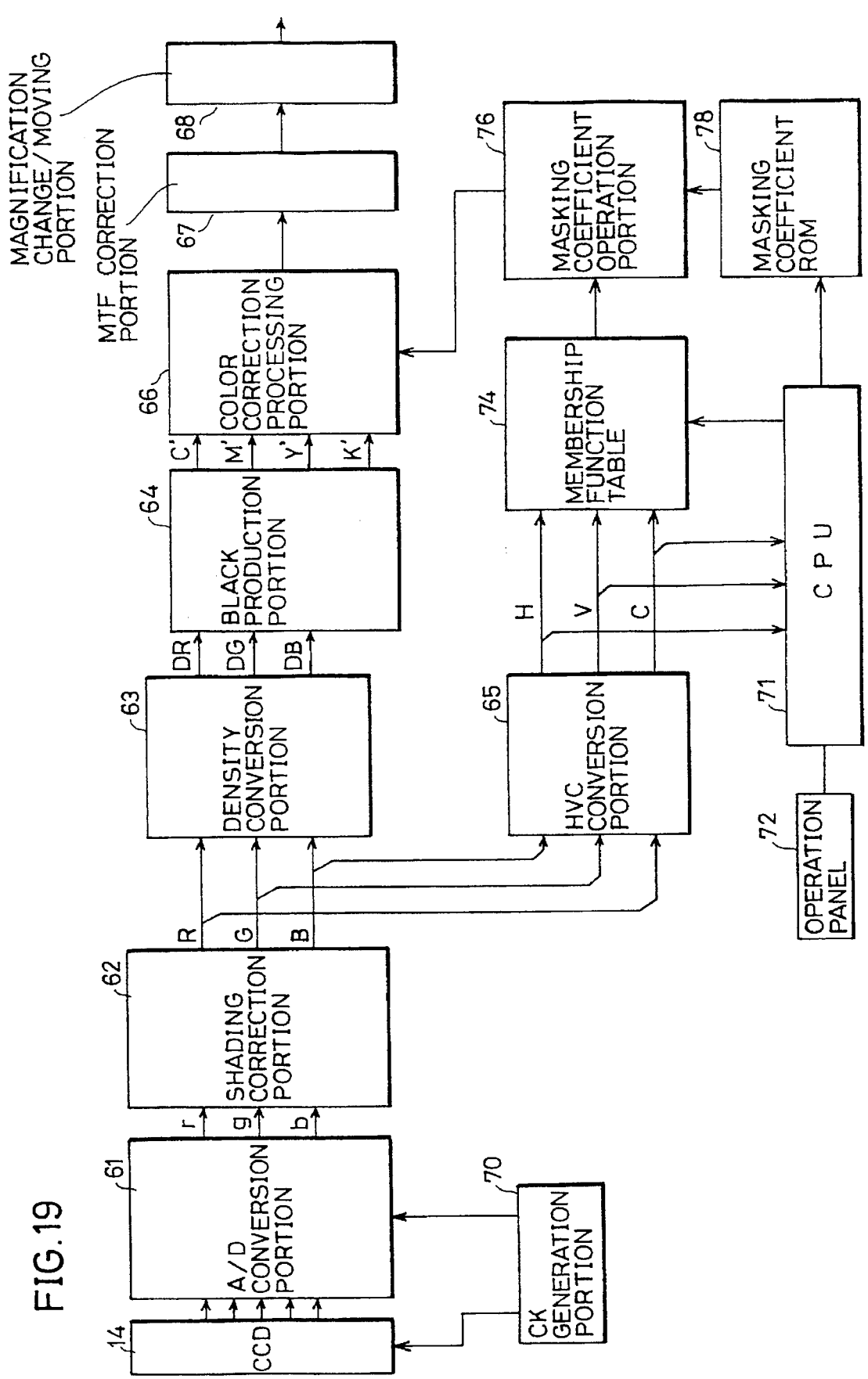
FIG. 19 is a block diagram specifically showing the structure of an image signal processing portion according to a fifth embodiment of the invention.

FIG. 19 is a block diagram showing the structure of an image signal processing portion in the fifth embodiment. Since the block diagram is substantially the same as the first embodiment shown in FIG. 14, and therefore different portions will be mainly described.

A masking coefficient ROM 78 stores a plurality of color conversion masking coefficients MSK (X→Y) together with masking coefficients $MSK_0$ for standard color correction. In this embodiment, the masking coefficients are of linear 3×3, and six colors, C, M, Y, R, G, and B are set as reference colors X and Y. Examples of $MSK_0$ and MSK (X→Y) are set forth below.

$$MSK_0 = \begin{bmatrix} A_1 & A_2 & A_3 \\ A_4 & A_5 & A_6 \\ A_7 & A_8 & A_9 \end{bmatrix} \quad (6)$$

-continued $$MSK_{R \to G} = \begin{bmatrix} 0 & 0.5 & 0.5 \\ 0 & 0 & 0 \\ 0 & 0.5 & 0.5 \end{bmatrix} \quad MSK_{R \to C} = \begin{bmatrix} 0 & 0.5 & 0.5 \\ 0 & 0 & 0 \\ 0 & 0 & 0 \end{bmatrix}$$

$$MSK_{C \to R} = \begin{bmatrix} 0 & 0 & 0 \\ 1 & 0 & 0 \\ 1 & 0 & 0 \end{bmatrix} \quad MSK_{C \to M} = \begin{bmatrix} 0 & 0 & 0 \\ 1 & 0 & 0 \\ 0 & 0 & 0 \end{bmatrix}$$

In a masking coefficient operation portion 76, masking coefficient $MSK_0$ for normal color correction is set as is when the color change function is inactive. When color conversion (X→Y) is set, data of MSK (X→Y) is sent together with $MSK_0$ from masking coefficient ROM 78 to masking coefficient operation portion 76, and a membership value $U_X$ corresponding to a target pixel is sent from a membership function table 74 at the same time. At masking coefficient operation portion 76, an optimum masking coefficient MSK given as follows is calculated with them.

$$MSK = (1 - U_X) \cdot MSK_0 + U_X \cdot MSK_{X \to R} \tag{7}$$

At color correction processing portion 66, output color data C, M and Y is calculated using the masking coefficient MSK determined by masking coefficient operation portion 76.

The foregoing is about the case in which color conversion (X→Y) is conducted for one set of colors only, but an optimum masking coefficient can be calculated based on the following expression if color change is conducted for a plurality of sets of colors, in other words color conversion $(X_1 \to Y_1)$, $(X_2 \to Y_2)$ ... is conducted.

$$MSK = (1 - U_{X1} - U_{X2} - \ldots - U_{Xn}) + U_{X1} \cdot MSK_{X1 \to Y1} + U_{X2} \cdot MSK_{X2 \to Y2} + \ldots + U_{Xn} \cdot MSK_{Xn \to Yn} \tag{8}$$

Note that in the above-described embodiment, the fuzzy theory is used for calculating masking coefficients, but a desired effect can be obtained using a simple color conversion matrix rather than the fuzzy theory for a color image with clear boundaries between different color regions.

Now, a sixth embodiment of the invention will be described.

In the fifth embodiment, one membership function specifying the degree of a color region subject to color change is produced for each color of interest, and a plurality of such membership functions may be provided for each color of interest in order to improve picture quality.

Figure 21:
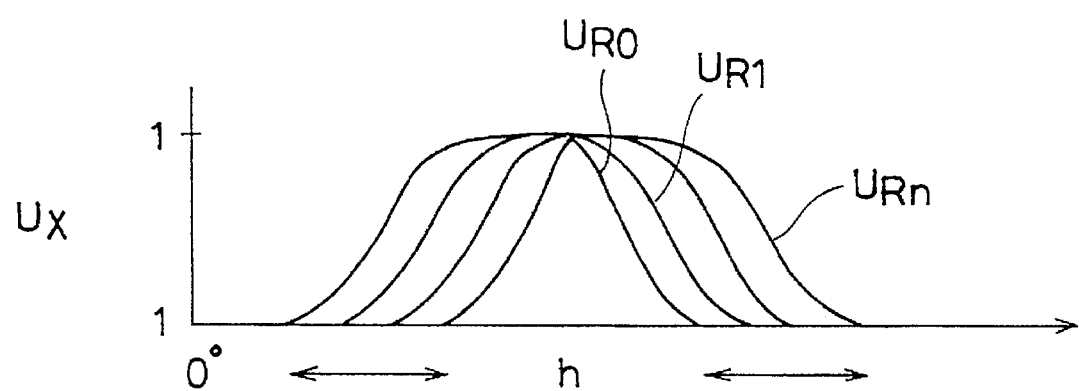
FIG. 21 is a graph showing examples of membership functions corresponding to the content of the display portion in FIG. 20.

More specifically, a display portion 56 for broadening or narrowing the range of color conversion corresponding to the plurality of membership functions in FIG. 21 may be provided. Thus, the range of a color to be changed may readily be changed, and therefore a natural color changed image without any harshness or pseudo-contour may be provided for any color change setting.

If the degree of rising or falling for one membership function is rendered variable, for example, rather than selecting one membership function from the plurality of memberships shown in FIG. 12, it will be possible to control the range not changed more finely.

Now, a seventh embodiment of the invention will be described. This embodiment is directed to an image processing apparatus having a color change function.

Figure 22:
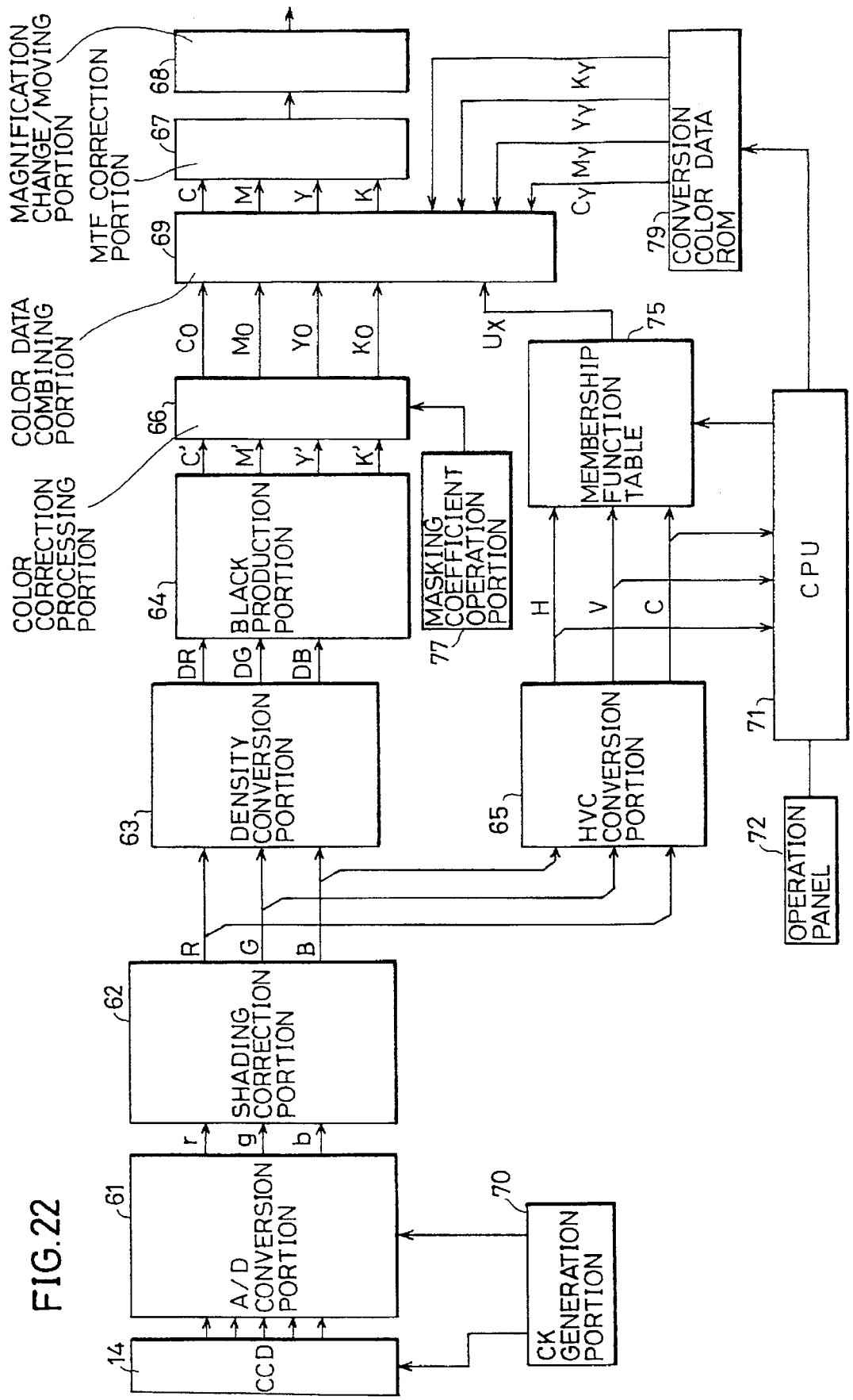
FIG. 22 is a block diagram specifically showing the structure of an image signal processing portion according to a seventh embodiment of the invention.

FIG. 22 is a block diagram showing the structure of an image signal processing portion according to the embodiment.

Portions in common with the first embodiment in FIG. 4 is not described here, and different portions will be mainly described.

In this embodiment, a color correction processing portion 66 which requires a simple circuit configuration conducts a masking processing. More specifically, at the time of under color removal control, data C', M', and Y' output from a black production portion 64 is multiplied by masking coefficients ($A_1$–$A_3$, $A_4$–$A_6$, $A_7$–$A_9$) output from masking coefficient operation portion 77, respectively. Values resulted from the multiplication $C_0$, $M_0$ and $Y_0$ are output to a color data combining portion 69. This embodiment employs the field sequential process including four scannings. Accordingly, one of $C_0$, $M_0$, $Y_0$, and $K_0$ is output from color correction processing portion 66 for one scanning, and at $K_0$, the above-described linear masking operation is not conducted and $K_0$ (=$\beta \cdot K'$) is directly output. In color data combining portion 69, combined color data (C, M, Y, K) is produced from a plurality of sets of colors (Ci, Mi, Yi, Ki) based on the following expression.

$$\begin{pmatrix} C \\ M \\ Y \\ K \end{pmatrix} = \Sigma \alpha i \begin{pmatrix} Ci \\ Mi \\ Yi \\ Ki \end{pmatrix} \tag{9}$$

Color data combining portion 69 receives as input ($C_0$, $M_0$, $Y_0$, $K_0$) output by black production and masking operation at color correction processing portion 66, a membership value $U_X$ determined for every pixel at the time of color conversion (X→Y), and color conversion target colors ($C_Y$, $M_Y$, $Y_Y$, $K_Y$) read out from conversion color data ROM 79. Based on these values, output color data (C, M, Y, K) is combined at color data combining portion 69. More specifically, the output color data is calculated based on the following expressions.

$$\begin{pmatrix} C \\ M \\ Y \end{pmatrix} = (1 - U_X) \begin{pmatrix} C_0 \\ M_0 \\ Y_0 \end{pmatrix} + U_X \begin{pmatrix} C_Y \\ M_Y \\ Y_Y \end{pmatrix} \tag{10}$$

where, $$\begin{pmatrix} C_0 \\ M_0 \\ Y_0 \end{pmatrix} = MSK_0 \begin{pmatrix} C' \\ M' \\ Y' \end{pmatrix}$$

$$K = (1 - U_X) \cdot K_0 + U_X \cdot K_Y \tag{11}$$

In addition, composition of output color data can be conducted not only for color conversion (X→Y) for a set of colors, but also for a plurality of sets of colors based on the following expressions.

$$\begin{pmatrix} C \\ M \\ Y \end{pmatrix} = (1 - \Sigma U_{xi}) \begin{pmatrix} C_0 \\ M_0 \\ Y_0 \end{pmatrix} + \Sigma U_{xi} \begin{pmatrix} C_{Yi} \\ M_{Yi} \\ Y_{Yi} \end{pmatrix} \tag{12}$$

$$K = (1 - \Sigma U_{Xi}) \cdot K_0 + \Sigma U_{Xi} \cdot K_Y \tag{13}$$

Note that when color data is combined, according to the field sequential process as in this embodiment, only $C_0$, $U_X$ and $C_Y$ in calculating C,
only $M_0$, $U_X$, and $M_Y$ in calculating M,
only $Y_0$, $U_X$, and $Y_Y$ in calculating Y, or
only $K_0$, $U_X$, and $K_Y$, in calculating K are transferred to color data composition portion 69.

Discrete $U_X$ at adjacent pixels may result in harshness in the image, which can be effectively be solved by a smoothing processing in a preceding or succeeding stage to an HVC conversion portion 65.

Figure 20:
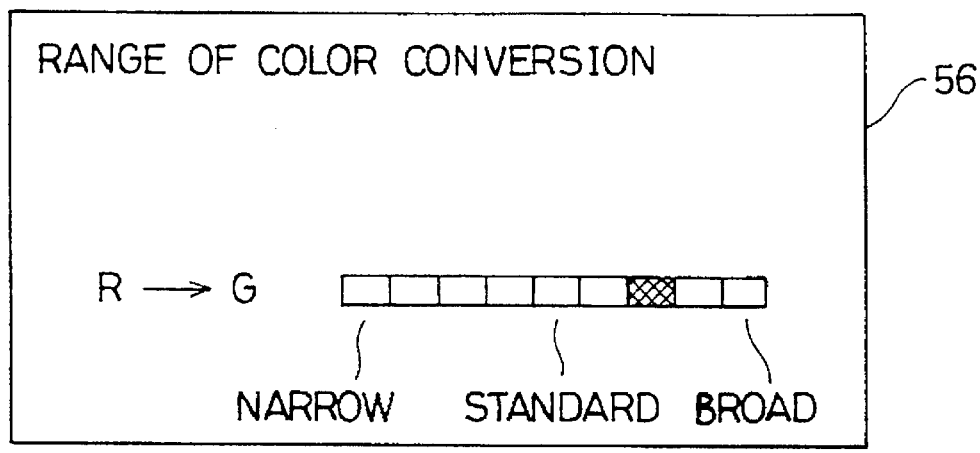
FIG. 20 is a view showing the content of a display portion on an operation panel according to a sixth embodiment of the invention.

Note that providing a plurality of membership functions determining the degree of color change depending upon the state of settings on the operation panel as illustrated in FIG. 20 and FIG. 21 in the sixth embodiment for switching depending upon the settings on the operation panel makes it possible to readily change the range, and a natural color-converted image without harshness or a pseudo-contour can be obtained.

Similarly, if, for example, the rising or falling of a membership function is rendered variable rather than selecting one membership function from a plurality of such functions, the range to be changed can be controlled more finely.

Note that in this embodiment, in the region at $U_x=1$, as can be seen from expressions (10) and (11), output color data is determined to be $(C_Y, M_Y, Y_Y, K_Y)$ and the image appears to be blacked out, but using function f with B, W obtained by HVC conversion of the second term of expression (10) or function g obtained with (DR, DG, DB), output color data can be combined as follows:

$$Ux \cdot f \cdot \begin{pmatrix} C_Y \\ M_Y \\ Y_Y \\ K_Y \end{pmatrix} \quad \text{or} \quad Ux \cdot g \cdot \begin{pmatrix} C_Y \\ M_Y \\ Y_Y \\ K_Y \end{pmatrix}$$

Thus, tone information or saturation information can be reflected upon the output color data.

For example, using $f=-LOG(V)$ or $g=\frac{1}{3} \cdot (DR+DG+DB)$, output color can be expressed in a color with shade.

Meanwhile, using $f=aW$ (a=constant) or $g=MAX$ (DR, DG, DB)–MIN (DR, DG, DB), output color can be expressed as a color having a color change target color and a gradation of achromatic color.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:

input means for inputting an image signal;

first storage means for storing a color correction masking coefficient and a color conversion masking coefficient;

second storage means for storing a membership function indicating to what degree said image signal belongs to a prescribed color region;

determination means for determining to what degree said input image signal belongs to the prescribed color region, using the membership function stored in said second storage means;

production means for combining the color correction masking coefficient and the color conversion masking coefficient stored in said first storage means based on said determined degree of belonging and producing a composite masking coefficient; and processing means for conducting a masking processing to said input image signal, using said produced composite masking coefficient.

2. An image processing apparatus, comprising:

input means for inputting an image signal;

storage means for storing a membership function indicating to what degree said image signal belongs to a prescribed color region;

determination means for determining to what degree said input image signal belongs to said prescribed color region using said stored membership function;

calculation means for calculating a masking coefficient based on said determined degree of belonging; and processing means for conducting a masking processing for the input image signal, using said calculated masking coefficient.

3. An image processing apparatus, comprising;

first storage means for storing a plurality of color correction masking coefficients for a plurality of color regions;

input means for inputting an image signal including color information;

second storage means for storing a plurality of membership functions corresponding to said plurality of color regions, each of said membership functions indicating to what degree color information included in an image signal belongs to each of said color regions;

determination means for determining to what degree each color information included in said input image signal belongs to a corresponding color region;

production means for combining a plurality of color correction masking coefficients stored in said first storage means based on each said determined degree of belonging and producing a composite color correction masking coefficient; and processing means for conducting a color correction masking processing for said input image signal, using said produced composite color correction masking coefficient.

4. An image processing apparatus, comprising:

input means for inputting an image signal;

first designation means for designating a first color;

second designation means for designating a second color;

storage means for storing membership functions, each of said membership functions indicating to what degree an image signal belongs to each of color regions corresponding to the colors designated by said first and second designation means;

determination means for determining the degree of belonging to each of said color regions for said input image signal, using said stored membership functions;

production means for producing a color conversion masking coefficient for converting the color designated by said first designation means into the color designated by said second designation means, based on said determined degree of belonging; and processing means for conducting a color conversion processing to said input image signal, using said produced color conversion masking coefficient.

* * * * *